United States Patent Office 3,661,770
Patented May 9, 1972

3,661,770
CHLOROSILANE ACTIVATION OF AN ISOMERIZATION CATALYST AND PARAFFIN ISOMERIZATION UTILIZING THE SAME
Edwin N. Givens, Glassboro, N.J., assignor to Mobil Oil Corporation
No Drawing. Filed Oct. 22, 1970, Ser. No. 83,183
Int. Cl. B01j 11/78; C07c 5/30
U.S. Cl. 260—683.68                                8 Claims

ABSTRACT OF THE DISCLOSURE

A Group VIII metal-alumina catalyst is pre-treated with a chlorosilane to produce a low temperature paraffin isomerization.

BACKGROUND OF THE INVENTION

(1) Field of the invention

This invention relates to the use of chlorosilane compounds to pre-treat Group VIII metal-alumina catalysts. This pre-treatment produces a low temperature paraffin isomerization catalyst.

(2) Description of the prior art

Pre-treatment of Group VIII metal-alumina catalyst with volatile chlorinated compounds has been recognized as a method for producing low temperature paraffin isomerization catalysts. For example, British Pat. No. 953,187 describes a paraffin isomerization catalyst which is prepared by contacting a hydrogen-containing alumina with particular monocarbon compounds such as carbon tetrachloride and chloroform.

U.S. 3,472,790 describes a low temperature paraffin isomerization catalyst which is prepared by contacting alumina which contains a metalliferous hydrogenating component with a mixture of sulfur dioxide and chlorine.

U.S. 3,440,300 describes a low temperature paraffin isomerization catalyst which is prepared by contacting a platinum-alumina catalyst with an organic chloride of at least two carbon atoms.

The prior art also indicates that all volatile chlorine containing compounds will not product active low temperature isomerization catalysts when contacted with a Group VIII metal-alumina catalyst. For example, British Pat. 953,187 indicates that methyl chloride and tetrachloroethane do not activate Group VIII metal-alumina catalysts.

SUMMARY OF THE INVENTION

This invention provides a method for preparing low temperature paraffin isomerization catalysts by contacting Group VIII metal-alumina catalyst with a volatile chlorosilane which can be represented by the following formula:

where at least one X is chlorine and X is selected from the group consisting of hydrogen, chlorine, methyl, ethyl, methoxy and ethoxy. After pre-treatment, the catalyst is used in isomerization of paraffin hydrocarbons.

DESCRIPTION OF SPECIFIC EMBODIMENTS

With the present interest in the removal of lead from gasoline, isomerization technology takes on an increased importance in petroleum processing. This particular invention provides a method for isomerizing straight chain $C_4$-$C_7$ paraffins at temperatures between about 150 and about 400° F. The ability to achieve isomerization at these relatively low temperatures is crucial as equilibrium data favor the formation of branched hydrocarbons at lower temperatures. For example, hexane equilibrium data show that 2,2 - dimethylbutane and 2,3 - dimethylbutane are favored below 400° F.

The activation of the Group VIII metal-alumina catalyst with a chlorosilane, in accordance with the present invention, takes place most favorably at a temperature between about 500 and about 900° F. However, temperatures as low as 400° F. and as high as 1200° F. may be used to achieve the desired activation.

The chlorosilane activating compound may be contacted with the Group VIII metal-alumina catalyst in any proportion, which will significantly increase the chlorine content of the alumina catalyst. A preferred percentage for the chlorine content of the alumina support is 2 percent to about 15 percent.

The chlorosilanes that are used to activate the alumina catalyst can be represented by the following formula:

where at least one X is chlorine and the other X substituents are selected from the group consisting of hydrogen, chlorine, methyl, ethyl, methoxy and ethoxy.

Particularly preferred chlorosilane activators are tetrachlorosilane, trichlorosilane and methyltrichlorosilane.

The chlorosilane should be added to the alumina support as slow as possible in order to ensure uniform distribution of the chlorine molecules.

Catalysts that have been activated by the process described herein are useful not only for effecting isomerization of saturated straight chain hydrocarbons such as n-butane, n-pentane and n-hexane but for cycloparaffins such as cyclopentane and cyclohexane and their methyl and dimethyl derivatives.

The catalyst base may be any convenient form of alumina. Among the suitable forms are aluminas prepared by calcining a beta-alumina trihydrate such as bayerite or mixtures thereof with other alumina hydrates. Additionally, aluminas prepared by calcining hydrated aluminas such as alpha alumina trihydrate, gibbsite, bauxite, boehmite and diaspore or mixtures thereof may be used.

The catalyst bases from which the activated catalysts are prepared are combined with a Group VIII metal. Examples of suitable materials are iron, cobalt, nickel, palladium and rhodium. The preferred metal is platinum. The metal component should be present in amounts that range from about .1 to about 2 percent. A preferred range is from about .3 to about .7 percent.

In a preferred embodiment of this invention the catalyst base is pre-treated with HCl to improve the susceptibility of the alumina for activation. Additionally, after the alumina has had a Group VIII metal deposited on it, a second treatment with HCl is preferably employed.

The following examples will illustrate the preparation and utility of these new paraffin-isomerization catalysts.

EXAMPLE 1

100 grams of a commercial naphtha reforming catalyst containing 0.35 percent platinum on an alumina base having a chlorine content of 0.6 percent and a surface area of 325 square meters per gram was calcined at 500° F. for 6 hours in air. This catalyst was then calcined at 1050° F. for 3 hours in a nitrogen stream of 300 cc. per minute. The catalyst was then reduced in a stream of hydrogen (300 cc. per minute) and anhydrous hydrogen chloride (62 cc. per minute) for 3 hours. The temperature was lowered to 560° F. and then a mixture of air (266 cc. per minute) and silicon tetrachloride (6.67 cc. of liquid per hour) was passed over the catalyst for a period of 3 hours. The catalyst was then purged with air (266 cc. per minute) in the following sequence:

(a) 1 hour at 560° F.
(b) 1 hour at 670° F.
(c) 1 hour at 805° F.

The temperature was reduced to 400° F. and the catalyst treated with a flow of anhydrous hydrogen chloride for 1.5 hours to produce the activated catalyst.

EXAMPLE 2

100 grams of a commercial naphtha reforming catalyst containing 0.35 percent platinum on an alumina base was activated in the same manner as in Example 1 except 6.67 cc. of trichlorosilane was used.

EXAMPLE 3

100 grams of a commercial naphtha reforming catalyst containing 0.35 percent platinum on an alumina base was activated in the same manner as in Example 1 except 6.67 cc. of methyltrichlorosilane was used.

EXAMPLES 4-6

N-hexane was passed over the above activated catalysts in order to test the catalysts for their isomerization ability. All of these tests were made at 250 or 300° F., under hydrogen pressure at 300 p.s.i.g., 1 L.H.S.V. and $H_2$/HC=24. The gaseous product was passed through a drop-out pot maintained at room temperature at 300 p.s.i.g. and then through a condenser immersed in a Dry-Ice acetone bath. Recoveries were quantitative.

Table I summarizes the results:

TABLE I

| Activator | SiCl$_4$ | | SiHCl$_3$ | | CH$_3$SiCl$_3$ | |
|---|---|---|---|---|---|---|
| Chlorine content of fresh catalyst | 4.28 | | 6.01 | | 5.65 | |
| Temperature of run | 300 | 250 | 300 | 250 | 300 | 250 |
| Pressure (p.s.i.g.) | 300 | 300 | 300 | 300 | 300 | 300 |
| Hours on stream | 5 | 12 | 6 | 12 | 6 | 11 |
| 2,2-dimethylbutane | 26 | 27 | 22 | 24 | 21 | 23 |
| 2-methylpentane and 2,3-dimethyl butane * | 43 | 44 | 45 | 46 | 46 | 46 |
| 3-methylpentane | 18 | 17 | 19 | 18 | 19 | 18 |
| n-Hexane | 12 | 11 | 13 | 12 | 13 | 12 |

* 2,3-dimethylbutane concentration is approximately 8-10%.

The above table indicates that platinum on alumina catalysts that are activated with chlorosilanes effectively promote the ability of such catalysts in isomerization of paraffin hydrocarbons.

EXAMPLE 7

A commercial naphtha reforming catalyst containing 0.35 percent platinum on an alumina base was calcined according to the method described in Example 1. It was then reduced in hydrogen at 900° F. The catalyst was then tested for isomerization ability as in Examples 4-6. The run was made at 300° F., 300 p.s.i.g. and for one hour on stream. The conversion of n-hexane was nil. This example establishes that non-activated platinum on alumina catalyst are ineffective for isomerization of n-hexane under the conditions of test.

What is claimed is:

1. A method of preparing a catalyst composition which comprises contacting a Group VIII metal-alumina composite with an activating compound of the general formula of:

wherein at least one X is chlorine and X is selected from the group consisting of hydrogen, chlorine, methyl, ethyl, methoxy and ethoxy at a temperature between about 500° F. to 900° F.

2. A method according to claim 1 where the activating compound is selected from the group consisting of tetrachlorosilane, trichlorosilane and methyltrichlorosilane.

3. A method according to claim 1 wherein the Group VIII metal is platinum.

4. A method according to claim 1 wherein the temperature is between about 550° and about 650° F.

5. A method according to claim 1 wherein the chlorine content of the activated catalyst is not above 15 percent.

6. A method for paraffin isomerization with a catalyst comprising a Group VIII metal deposited on an alumina support, said method comprising activating said catalyst by contacting the same at a temperature of about 500° F. to about 900° F. with an activating compound of the general formula:

wherein at least one X is chlorine and X is selected from the group consisting of hydrogen, chlorine, methyl, ethyl, methoxy and ethoxy and thereafter employing said activated catalyst in effecting isomerization of a paraffin hydrocarbon.

7. A process for isomerization of a paraffin hydrocarbon at a temperature of about 150 to about 400° F. and at a pressure of about 250 to about 300 p.s.i.g. in the presence of the catalyst of claim 1.

8. A method of isomerization according to claim 7 wherein the paraffin hydrocarbon is n-hexane.

References Cited

UNITED STATES PATENTS

| 3,213,156 | 10/1965 | Harding et al. | 252—441 |
| 3,242,229 | 3/1966 | Estes | 260—683.68 |
| 3,336,239 | 8/1967 | Bailey et al. | 252—441 |
| 3,440,300 | 4/1969 | Estes et al. | 260—683.68 |
| 3,551,516 | 12/1970 | Ashley et al. | 260—683.68 |
| 3,553,281 | 1/1971 | Goble et al. | 260—683.68 |

DELBERT E. GANTZ, Primary Examiner

G. J. CRASANAKIS, Assistant Examiner

U.S. Cl. X.R.

252—441, 442

PO-1050 (5/69)

UNITED STATES PATENT OFFICE
CERTIFICATE OF CORRECTION

Patent No. 3,661,770             Dated May 9, 1972

Inventor(s) Edwin N. Givens

It is certified that error appears in the above-identified patent and that said Letters Patent are hereby corrected as shown below:

Column 1, line 15        "isomerization" should read --isomerization catalyst--.

Column 1, line 43        "product" should read --produce--.

Signed and sealed this 5th day of September 1972.

(SEAL)
Attest:

EDWARD M. FLETCHER, JR.                ROBERT GOTTSCHALK
Attesting Officer                      Commissioner of Patents